(12) United States Patent
Van Der Molen et al.

(10) Patent No.: US 10,065,849 B2
(45) Date of Patent: Sep. 4, 2018

(54) LIQUID DISPENSING TAP AND LIQUID CONTAINER PROVIDED THEREWITH

(71) Applicant: IPN IP B.V., DC Houten (NL)

(72) Inventors: Peter Jan Van Der Molen, The Hague (NL); Willem Jan Adriaan Oosterling, Loon Op Zand (NL); Johannes Wilhelmus Van Tuil, Tilburg (NL); Christopher John Murray, Chicago, IL (US)

(73) Assignee: Scholle IPN IP B.V. (NL)

( * ) Notice: Subject to any disclaimer, the term of this patent is extended or adjusted under 35 U.S.C. 154(b) by 0 days.

(21) Appl. No.: 15/127,016

(22) PCT Filed: Feb. 19, 2015

(86) PCT No.: PCT/NL2015/050102
§ 371 (c)(1),
(2) Date: Sep. 17, 2016

(87) PCT Pub. No.: WO2015/142164
PCT Pub. Date: Sep. 24, 2015

(65) Prior Publication Data
US 2017/0107094 A1 Apr. 20, 2017

(30) Foreign Application Priority Data
Mar. 18, 2014 (NL) ..................................... 2012469

(51) Int. Cl.
*B67D 3/00* (2006.01)
*B67D 3/04* (2006.01)
(Continued)

(52) U.S. Cl.
CPC ........... *B67D 3/045* (2013.01); *B65D 77/067* (2013.01); *F16K 1/12* (2013.01)

(58) Field of Classification Search
CPC ..... B65D 47/248–47/249; B67D 3/045; B67D 3/043; F16K 1/12; F16K 21/00; F16K 21/04; F16K 27/02
(Continued)

(56) References Cited

U.S. PATENT DOCUMENTS 85,006 A * 12/1868 Bradford ................. F16K 21/04
251/50
270,353 A * 1/1883 Barr ........................ F16K 21/04
251/323
(Continued)

FOREIGN PATENT DOCUMENTS

| GB | 2333288 A | 7/1999 |
| WO | 2006000437 A1 | 1/2006 |
| WO | 2010143018 A1 | 12/2010 |

*Primary Examiner* — Paul R Durand
*Assistant Examiner* — Randall Gruby
(74) *Attorney, Agent, or Firm* — The Watson IP Group, PLC; Jovan N. Jovanovic; Vladan M. Vasiljevic

(57) ABSTRACT

Liquid dispensing tap 1 connectable to a liquid container 70, e.g. a bag in box, for controlled dispensing of a liquid therefrom. The tap comprises a housing 10 forming an inlet of the tap and comprising a dispensing chamber wall portion 13 delimiting a dispensing chamber 14 with a valve seat 16 at an axial end and forming a lateral dispensing outlet 17 in communication with the dispensing chamber 14. The tap 1 comprises a plunger 30 with a stem 31 and a valve portion 32, the stem having an actuator engagement portion 33 outside said dispensing chamber and extending along an axis 15 through a bore 18 in the dispensing chamber wall portion and through the dispensing chamber. The plunger moves axially between a closed and an open position. A manually operable plunger actuator 50 engages said engagement portion of the stem to open the tap.

12 Claims, 10 Drawing Sheets

Figure 1:
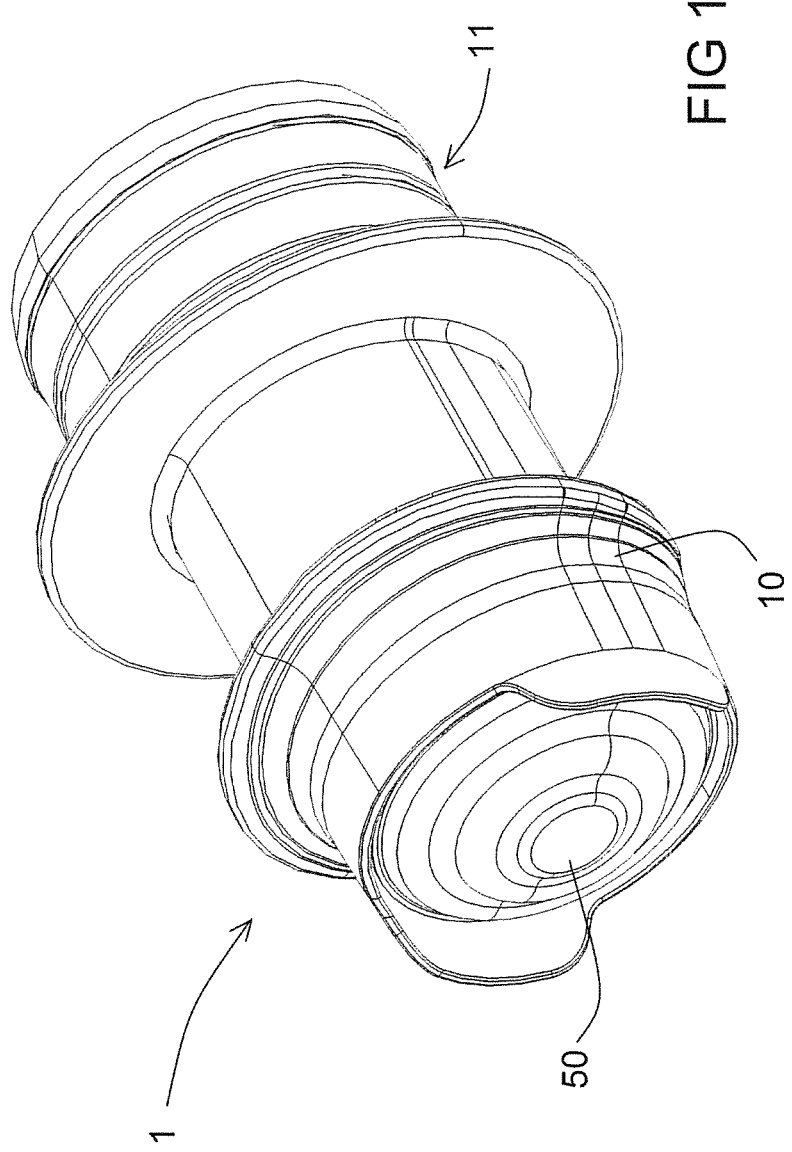

(51) Int. Cl.
*F16K 1/12* (2006.01)
*B65D 77/06* (2006.01)

(58) Field of Classification Search
USPC .................................. 222/518; 251/320–324
See application file for complete search history.

(56) References Cited

U.S. PATENT DOCUMENTS

| | | | | |
|---|---|---|---|---|
| 1,818,856 A * | 8/1931 | Langdon | ................... | F16K 1/14 |
| | | | | 251/320 |
| 2,084,698 A * | 6/1937 | Mollet | ..................... | F16K 27/02 |
| | | | | 251/215 |
| 2,090,309 A * | 8/1937 | Ripley | .................. | F16K 31/528 |
| | | | | 251/118 |
| 2,197,352 A * | 4/1940 | Terkel | .................... | B67D 3/044 |
| | | | | 137/588 |
| 2,506,722 A * | 5/1950 | Kuehn | .................... | F16K 21/04 |
| | | | | 251/322 |
| 2,628,062 A * | 2/1953 | Weber | ..................... | F16K 21/04 |
| | | | | 251/210 |
| 2,685,978 A * | 8/1954 | Crockett | .............. | B67D 1/0456 |
| | | | | 215/283 |
| 2,713,988 A * | 7/1955 | Kitterman | ............... | F16K 21/04 |
| | | | | 222/518 |
| 3,187,770 A * | 6/1965 | Plamann | ................ | B67D 3/043 |
| | | | | 137/589 |
| 3,331,580 A * | 7/1967 | Fattori | .................... | F16K 21/14 |
| | | | | 251/322 |
| 3,355,143 A * | 11/1967 | Mueller | ................. | B67D 3/043 |
| | | | | 251/321 |
| 3,584,834 A * | 6/1971 | Reid | ....................... | F16K 21/04 |
| | | | | 137/375 |
| 3,730,224 A * | 5/1973 | Prisk | ........................ | F16K 1/32 |
| | | | | 137/625.33 |
| 4,015,632 A * | 4/1977 | Frahm | .................. | B65D 47/248 |
| | | | | 251/144 |
| 4,440,316 A * | 4/1984 | Christine | ............. | B65D 47/248 |
| | | | | 137/903 |
| 4,475,566 A * | 10/1984 | Haines | ...................... | B67B 7/26 |
| | | | | 137/318 |
| 4,687,123 A * | 8/1987 | Hyde | ....................... | F16K 21/04 |
| | | | | 222/518 |
| 5,299,718 A * | 4/1994 | Shwery | ................ | B65D 47/248 |
| | | | | 137/903 |
| 5,337,775 A * | 8/1994 | Lane | .................... | B65D 77/067 |
| | | | | 137/318 |
| 5,447,257 A * | 9/1995 | Dark | ......................... | F16K 1/32 |
| | | | | 137/801 |
| 6,401,752 B1 * | 6/2002 | Blackbourn | ......... | B65D 47/248 |
| | | | | 222/183 |
| 6,648,186 B2 * | 11/2003 | Roethel | .................. | B65D 83/48 |
| | | | | 137/903 |
| 7,240,811 B2 * | 7/2007 | Roser | ..................... | B67D 3/044 |
| | | | | 137/588 |
| 7,455,281 B2 * | 11/2008 | Craft | ....................... | F16K 15/18 |
| | | | | 222/518 |
| 7,789,269 B2 * | 9/2010 | Pritchard | ............. | A47K 5/1208 |
| | | | | 222/207 |
| 7,997,461 B2 * | 8/2011 | Lester | .................... | B67D 3/043 |
| | | | | 222/509 |
| 8,091,743 B2 * | 1/2012 | Lester | .................... | B67D 3/045 |
| | | | | 222/509 |
| 8,091,745 B2 * | 1/2012 | Neukirch | ............. | B67D 1/0462 |
| | | | | 222/518 |
| 8,113,239 B2 * | 2/2012 | Richards | ................ | B67D 3/044 |
| | | | | 137/587 |
| 8,402,999 B2 * | 3/2013 | Nini | ....................... | B67D 3/044 |
| | | | | 137/533.19 |
| 8,464,917 B2 * | 6/2013 | Nini | ..................... | B67D 3/0045 |
| | | | | 222/481.5 |
| 8,584,909 B2 * | 11/2013 | Totten | .................... | B67D 3/043 |
| | | | | 222/509 |
| 8,602,387 B2 * | 12/2013 | Wrigley | ............... | B65D 47/283 |
| | | | | 222/518 |
| 9,448,095 B2 * | 9/2016 | Maher | .................... | B65D 11/22 |
| 2002/0079001 A1 * | 6/2002 | Blackbourn | ........... | B67D 3/044 |
| | | | | 137/588 |
| 2004/0256423 A1 * | 12/2004 | Roser | ..................... | B67D 3/043 |
| | | | | 222/518 |
| 2005/0263546 A1 * | 12/2005 | Labinski | ................ | B67D 3/044 |
| | | | | 222/478 |
| 2007/0181615 A1 * | 8/2007 | Allanson | ............. | B65D 47/248 |
| | | | | 222/518 |
| 2008/0237276 A1 * | 10/2008 | Lester | .................... | B67D 3/043 |
| | | | | 222/518 |
| 2008/0245816 A1 * | 10/2008 | Armstrong | ................ | B67B 7/24 |
| | | | | 222/81 |
| 2011/0017782 A1 * | 1/2011 | Nini | ..................... | B67D 3/0045 |
| | | | | 222/518 |
| 2011/0042420 A1 * | 2/2011 | Totten | .................... | B67D 3/043 |
| | | | | 222/518 |
| 2012/0074343 A1 * | 3/2012 | Meintjes | ................ | B67D 3/045 |
| | | | | 251/318 |
| 2017/0066641 A1 * | 3/2017 | Van Der Molen | ..... | B67D 3/045 |
| 2017/0190562 A1 * | 7/2017 | Trettin | ................... | B67D 3/045 |

* cited by examiner

LIQUID DISPENSING TAP AND LIQUID CONTAINER PROVIDED THEREWITH

The present invention relates to a liquid dispensing tap adapted to be connected to a liquid container, e.g. to a pouch, e.g. a pouch of a bag in box container, for controlled dispensing of a liquid from said container.

Bag in box containers are commonly used to package beverages, like wine, fruit juice, milk, and other liquids, e.g. detergents, motor oils, etc. In order to allow a user to controllable dispense the liquid from the container, e.g. to fill a glass of wine, it is known to provide the packaging with a manually operable tap. The tap can be prefitted on the pouch of the bag in box packaging or supplied along with the packaging so that the user can fit the tap.

Examples of a liquid dispensing tap are shown in GB 2 138 544 and GB 2 169 061. These known taps comprise a housing with a connector portion that is adapted to connect the tap to a liquid container and that forms an inlet of the liquid from the container into the tap. The housing further comprises a dispensing chamber wall portion which delimits a dispensing chamber. This wall portion comprises a valve seat at an axial end thereof and also forms a lateral dispensing outlet of the tap in open communication with the dispensing chamber. The outlet is commonly downwardly directed in use, so that one can pour the liquid directly into a glass or other receptacle.

The known taps also comprises a one piece molded plastic plunger with a valve portion that is integrally molded with a stem of the plunger. The stem has an actuator engagement portion outside the dispensing chamber. The stem extends along an axis through a bore in the dispensing chamber wall portion and through the dispensing chamber. The valve portion is embodied to cooperate with the valve seat and the plunger is movable along the axis between a closed position, wherein the tap is closed, and an open position.

The known taps comprises a push-button that serves as a manually operable plunger actuator. The push-button is connected to the engagement portion of the stem of the plunger and by depressing the push-button the user opens the tap to dispense the liquid.

Such liquid dispensing taps are mass produced, low cost products as they are commonly disposed when the container has been emptied. Cost price is therefore one issue associated with such taps. However other issues, such as the closing effect of the tap in order to guarantee the quality of the liquid in the container or the behaviour of the tap as it is operated by the user also play a role.

The present invention aims to propose measures that provide improvements over the known taps and liquid containers provided with such taps.

According to a first aspect thereof the present invention provides a liquid dispensing tap adapted to be connected to a liquid container according to claim 1, wherein the plunger has an integrally molded annular flexible sealing lip that extends around the stem, and wherein the bore forms a cylinder along said axis, and wherein the sealing lip slides within and sealing engages the cylinder in any position of the plunger.

The above inventive measure provides a reliable seal between the dispensing chamber through which the liquid flows towards the outlet on the one hand and the location of the plunger actuator on the other. Furthermore the sealing structure provides an enhanced guidance of the stem relative to the housing with frictional forces being governed by the sealing lip. This e.g. allows for enhanced control by the user when opening the tap and/or for enhanced retraction of the plunger to its closed position, e.g. retraction by means of a resilient material push button acting as actuator of the tap.

In an embodiment the bore has an end wall at one end of the cylinder and a guide sleeve adjoining the end wall, which guide sleeve is concentric with the cylinder and has an inner diameter that is smaller than an inner diameter of the cylinder. The stem extends through this guide sleeve with some play. The provision of the guide sleeve allows to absorb any lateral loads on the stem, e.g. due to a non-axial force being exerted on a push button connected to the stem, so that the sealing lip is not or at least not unduly strained by any such lateral loads.

In an embodiment the guide sleeve extends at least partially within the cylinder, wherein the guide sleeve has a plunger stop end face, and wherein the plunger has a corresponding stop portion, so that the plunger stop end face determines the closed position of the plunger. The use of the guide sleeve as an end stop for the plunger allows for a design of the valve portion and valve seat in such a manner that the valve does not act as end stop for the plunger in closed position as e.g. in the GB 2 138 544 and GB 2 169 061 prior art taps. More preferably this embodiment of a tap with guide sleeve allows for an embodiment wherein the valve seat has a substantially cylindrical valve seat surface, wherein the valve portion is embodied as a dish with a flexible peripheral rim that is primarily compressed in radial direction when contacting the valve seat surface. In contrast to valves with a conical valve seat, this valve design does not require an exact axial position of the plunger in order for the tap to be reliably closed, nor does the design require the valve portion mating with the valve seat to be very flexible in order to absorb any tolerances in the parts of the tap or any axial misalignment of the plunger. Therefore this tap design allows the designer, when desired, to embody the valve portion semi-rigid or at least with a relative rigidity that enhances the closing effect of the tap compared to a very flexible conical valve.

In an embodiment the stem has a small diameter section extending through the guide sleeve and large diameter section within the dispensing chamber. The stem has a shoulder between these small and large diameter sections, and this shoulder forms the stop portion of the plunger defining the closed position of the plunger, e.g. in combination with a stop face formed by the dispensing chamber wall portion. This allows for a simple structure of the plunger, e.g. in view of injection molding such a plunger.

In a further development hereof the stem has a hollow cavity that extends from an open end at the side of the valve portion through the large and small diameter sections to a blind end at the side of the engagement portion. This is advantageous in view of rigidity of the valve stem and in view of injection molding the plunger. In an embodiment the greater diameter section of the stem has a diameter that is at least 35% of the diameter of the valve portion, e.g. between 35% and 75%, thus providing a stable base for the valve portion. In an embodiment the stem has one or more axial reinforcement ribs within the hollow cavity, e.g. only in a larger inner diameter section of the hollow cavity corresponding to the larger diameter section of the stem.

In an embodiment the stem has a small diameter section extending through the guide sleeve and large diameter section within the dispensing chamber. The stem has a shoulder between these small and large diameter sections and the annular flexible sealing lip extends from this shoulder concentrically about the small diameter section of the stem. Even if the shoulder does not function as end stop of the plunger in closed position, this design provides in an efficient manner a stable base for the flexible sealing lip and allows for efficient injection molding of the plunger.

In an embodiment the valve seat has a substantially cylindrical valve seat surface and the valve portion is embodied as a dish with a flexible peripheral rim that is primarily compressed in radial direction when contacting the valve seat surface. Preferably the rim extends away from the dish in the direction of opening the tap. For example the dish is conical, arranged at an angle in the opening direction relative to the stem, and the rim is substantially cylindrical, e.g. with a spherical ring sector contour.

In an embodiment the stem is hollow with an open end at the valve portion and a blind end at the side of the engagement portion. This enhances the manufacture of the plunger by means of injection moulding and allows to obtain increased rigidity whilst efficient use is made of plastic material. In an embodiment the stem has one or more axial reinforcement ribs within the hollow cavity.

In an embodiment the dispensing chamber wall portion is provided with multiple guide fingers that extend axially away from the valve seat in the direction of the open position of the plunger, which fingers each have a free end remote from the valve seat. The guide fingers guide and support the valve portion as the plunger is moved between the closed and open position thereof. In the open position liquid ports are exposed between the fingers allowing the passage of the liquid from the inlet into the dispensing chamber. This measure is advantageous as it affords a proper support and guidance of the plunger. In a suitable embodiment it also affords an enhanced control of the opening of the tap by the user, as—during the opening motion—the forces resisting opening motion of the plunger are primarily formed by the frictional force of the sealing lip and the frictional force of the valve portion. In absence of suitable designed guide fingers the valve portion would only resist such opening motion whilst in the valve seat, and then offer no resistance which results in a sudden opening of the tap. As the fingers may continue to provide some resisting force, with the designer being able to design the frictional force by suitable dimensioning the valve portion and fingers and/or selection of materials, this sudden drop in resistance may be avoided enhancing the user's ability to control the opening of the tap.

In a preferred embodiment each finger is embodied as a free standing tab that is only connected at one axial end thereof to the valve seat, with the housing having an outer wall portion that is arranged around said fingers and radially spaced from said fingers. This will, e.g., allow the fingers to exhibit some flexibility compared to the rigid outer wall portion even when made from the same plastic material as a one piece housing.

In an embodiment the guide fingers each have a guide face contacting the valve portion with a curvature corresponding to a curvature—in circumferential direction—of the guided valve portion so that a low pressure surface contact is present avoiding local wear of the valve portion due to repeated opening and closing of the tap.

In a possible embodiment each guide finger has sides that determine an increasing width of the finger in the direction towards the valve seat. In embodiments this design may be used to cause, e.g. compared to uniform width guide fingers, an amplified increased reduction of the effective liquid port area when the plunger moves to the closed position.

The tap with the mentioned guide fingers shows an effective cut off of the liquid flow when the tap is closed, e.g. as the user ceases to depress a push button and a resilient member of the tap, e.g. formed by the push button, possibly in combination with a liquid head in the container, caused the plunger to move to the closed position. It will be appreciated that the provision of guide fingers allows the designer to design the number and size of the fingers in view of a desired effective area of the liquid ports when the tap is fully opened. As explained the shape of the fingers may be a design parameter in view of the manner in which this area is reached when the plunger moves from the closed to the open position. Furthermore the fingers allow for an efficient injection molding of the housing, primarily in an embodiment wherein the connector portion is a tubular portion that forms the inlet and is aligned on the axis, which tubular portion has been formed by an injection molding core which also forms the guide fingers, valve seat, and at least a part of the dispensing chamber.

In an embodiment the housing has an outer wall portion forming an exterior of the tap and the dispensing chamber wall portion forms a valve seat within and radially spaced from the outer wall portion. This allows for the valve seat to be independent from the outer wall, e.g. not or only minimal subjected to any manufacturing tolerances or deformation of the outer wall, which enhances the reliability of the tap. For example the mentioned injection moulding core comprises an annular groove cavity portion that forms the valve seat.

In an embodiment, as known from the mentioned prior art and common in the field, the actuator is a manually depressable push button, that is exposed to allow operation by a user's finger, e.g. a thumb. Preferably the exterior of the housing has one or more finger grip members allowing a user to grip the housing with one or more fingers and depress the push button using the thumb.

Other embodiments of the actuator are also possible, e.g. a depressable lever, a rotary knob, etc.

In an embodiment, as known from the mentioned prior art and common in the field, the actuator comprises a resilient biasing member providing a biasing force on the plunger urging the plunger to the closed position thereof. Preferably the push button is embodied as a one piece resilient material push button providing said biasing force. For example the push button is made of polypropylene (PP) or Polyoxymethylene (POM).

In an embodiment the actuator comprises a one piece resilient polypropylene material push button providing said biasing force. It has been found that polypropylene as material for the push button offers the desired resiliency and form restoring properties to obtain the biasing of the plunger to the closed position. Also polypropylene offers desired durability for use in the tap. In an alternative the push button is made of an elastomer, e.g. a thermoplastic elastomer (TPE).

In an embodiment the one piece resilient material push button has a collar portion that is secured to the housing of the tap and a depressable wall bridging the collar portion. In an embodiment the collar portion is held on a tubular retention wall portion of the housing, e.g. the collar portion clamping elastically on said inner retention wall portion, e.g. the collar portion having circular ridges on the inner face thereof that enhance the retention of the tubular retention wall portion, e.g. said wall portion having mating circular grooves.

In an embodiment a depressable wall portion of the one piece molded resilient plastic material push button has a user engagement face with a central area and has a stem connector portion at the opposite face. In non-mounted condition of the push button the central area is axially raised relative to the outer perimeter of the wall portion. Between the central area and the outer perimeter the depressable wall portion has multiple concentric undulations that enhance the resiliency and form restoring effect of the wall portion. As is preferred the outer perimeter is integral with a collar portion described above. In an embodiment an undulation is formed by three concentric and integral regions:

a first conical annular region, widening towards the outer perimeter of the wall portion, an intermediate radial annular region, adjoining the first conical annular region and extending substantially in a radial plane of the push button, a second conical annular region, adjoining the intermediate radial annular region and widening towards the outer perimeter of the wall portion.

For example, the push button has two undulations between the central area and the outer perimeter.

In an embodiment, as known from the mentioned prior art, the push button comprises a snap fit collar serving as stem connector. The snap fit collar having an outer diameter, which snap fit collar is snap fitted over a snap fit head forming an engagement portion of the stem of the plunger, wherein the snap fit collar has an end from a stop face, and wherein the housing has—at said bore—an abutment portion that cooperates with said stop face of the snap fit collar to define the open position of the plunger, and wherein the housing has—at said bore —a recessed cavity into which the snap fit collar enters when the plunger is in the open position thereof.

In an inventive development thereof the recessed cavity is embodied as a locking cavity which has a diameter corresponding to the diameter of the snap fit collar such that the collar is unable to disengage from the snap fit head when entered into the locking cavity. This avoids any chance that when a user exerts a excessive axial force on the plunger, the snap fit will unlock or at least become overly strained, e.g. causing the snap fit to become undone and thereby the push button detached from the plunger. The latter situation is in particular detrimental in an embodiment wherein the push button itself is embodied as a resilient member, e.g. the push button being a one piece product made of a resilient plastic material, as then the plunger is not biased to its closed position.

According to a second aspect thereof the present invention relates to a liquid dispensing tap according to claim 14, wherein the dispensing chamber wall portion is provided with multiple guide fingers that extend away from the valve seat in the direction of the open position of the plunger, which fingers each have a free end remote from the valve seat, wherein the guide fingers guide and support the valve portion as the plunger is moved between the closed and open position thereof, wherein—in the open position—liquid ports are exposed between the fingers allowing passage of liquid from the inlet into the dispensing chamber.

The advantages of the guide fingers as well as embodiments thereof have already been described above. It will be appreciated that the tap of the second aspect of the invention may include any of the details, including optional details, discussed herein with reference to the tap according to the first aspect of the invention.

According to a third aspect thereof the present invention relates to a liquid dispensing tap according to claim 15, wherein the recessed cavity is embodied as a locking cavity which has a diameter corresponding to the diameter of the snap fit collar such that the collar is unable to disengage from the snap fit head when entered into the locking cavity.

As explained above, prior art designs as illustrated in the mentioned GB2 138 544 and GB2 169 061, entail the risk that a user exerts too much force on the push button causing the snap fit connection to become disconnected or overly strained. The design of the cavity as a locking cavity avoids this risk as the snap fit cannot disconnect due to the lack of sufficient play between the snap fit collar and the locking cavity for such disconnection.

It will be appreciated that the tap of the third aspect of the invention may include any of the details, including optional details, discussed herein with reference to the tap according to the first aspect of the invention.

According to a fourth aspect thereof the present invention relates to a liquid dispensing tap according to claim 16, wherein the stem has small diameter section extending through said bore sleeve and large diameter section within the dispensing chamber, wherein the stem has a shoulder between said small and large diameter sections, and wherein the stem is hollow cavity that extends from an open end at the valve portion through the large and small diameter section to a blind end at the side of the engagement portion.

As the stem is the structural backbone of the plunger, this design allows to create a robust stem even if relatively resilient, e.g. semi rigid plastic material is used to manufacture the stem, or, as is preferred, a one piece plunger having the stem, the valve portion and, if desired, the flexible sealing lip according to the first aspect of the invention.

In an embodiment the greater diameter section of the stem has a diameter that is at least 35% of the diameter of the valve portion, so that the stem provides a stable base for the valve portion. For example the stem has a diameter about 50% of the valve portion diameter.

It will be appreciated that the tap of the fourth aspect of the invention may include any of the details, including optional details, discussed herein with reference to the tap according to the first aspect of the invention.

According to a fifth aspect thereof the present invention relates to a liquid dispensing tap according to claim 18, wherein a manually operable push button is connected to the engagement portion of the stem of the plunger allowing a user to open the tap for dispensing of liquid, which push button is embodied as a one piece resilient material push button providing a biasing force on the plunger urging the plunger to the closed position thereof, and wherein the push button is made of polypropylene (PP) or a thermoplastic elastomer (TPE).

It has been found that polypropylene as material for the push button offers the desired resiliency and form restoring properties to obtain the biasing of the plunger to the closed position. Also polypropylene offers desired durability for use in the tap. A thermoplastic elastomer (TPE) can be used also as material for the push button.

It will be appreciated that the tap of the fifth aspect of the invention may include any of the details, including optional details, discussed herein with reference to the tap according to the first aspect of the invention.

According to a sixth aspect thereof the present invention relates to liquid dispensing tap according to claim 19, wherein the push button is embodied as a one piece resilient material push button providing a biasing force on the plunger urging the plunger to the closed position thereof, wherein the push button has a depressable wall portion with a user engagement face having a central area and with a stem connector portion at an opposite face of said central area, wherein the push button has an outer perimeter secured to the housing of the tap, and wherein the push button has multiple concentric undulations between the central area and the outer perimeter of the depressable wall portion, preferably the central area being axially raised relative to the outer perimeter of the depressable wall portion.

The provision of undulations enhances the resiliency and form restoring effect of the wall portion, e.g. allowing for the advantageous use of polypropylene (PP), or a thermoplastic elastomer (TPE), to manufacture the push button.

It will be appreciated that the tap of the sixth aspect of the invention may include any of the details, including optional details, discussed herein with reference to the tap according to the first aspect of the invention.

The present invention also relates to a container, e.g. a pouch, e.g. a pouch of a bag in box container, provided with a liquid dispensing tap according to one or more of the aspects of the invention.

Figure 2:
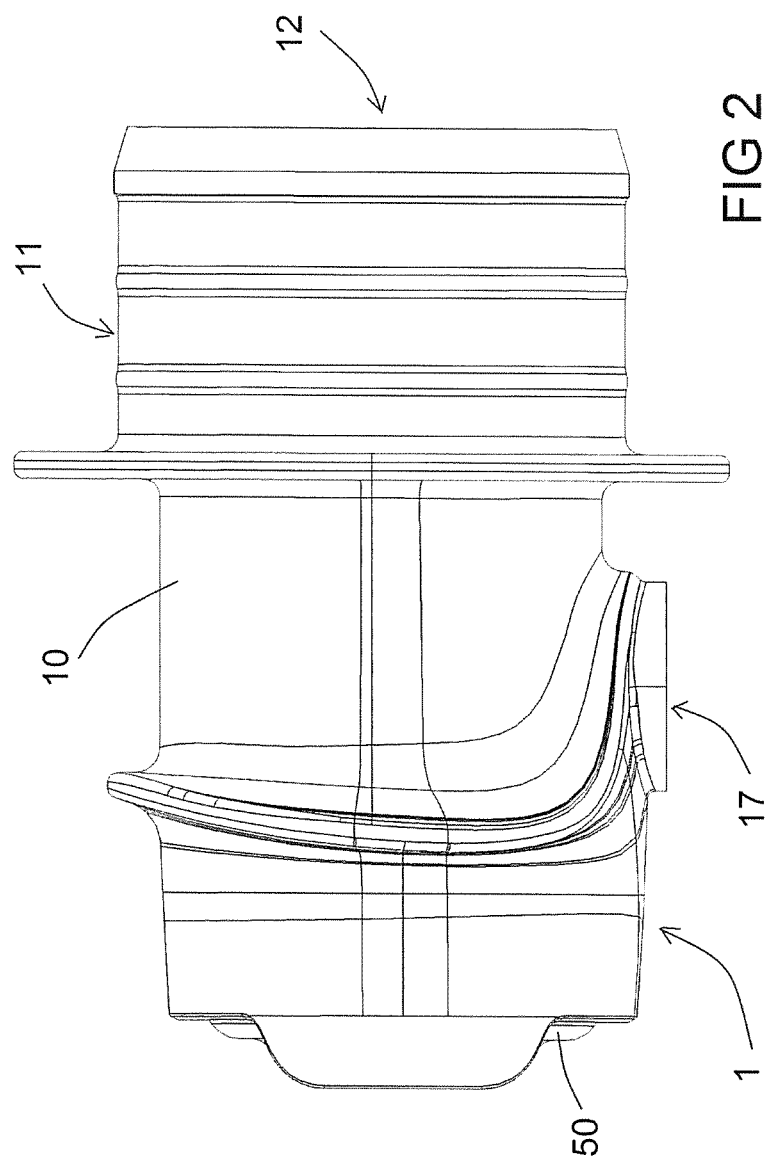
Figure 3:
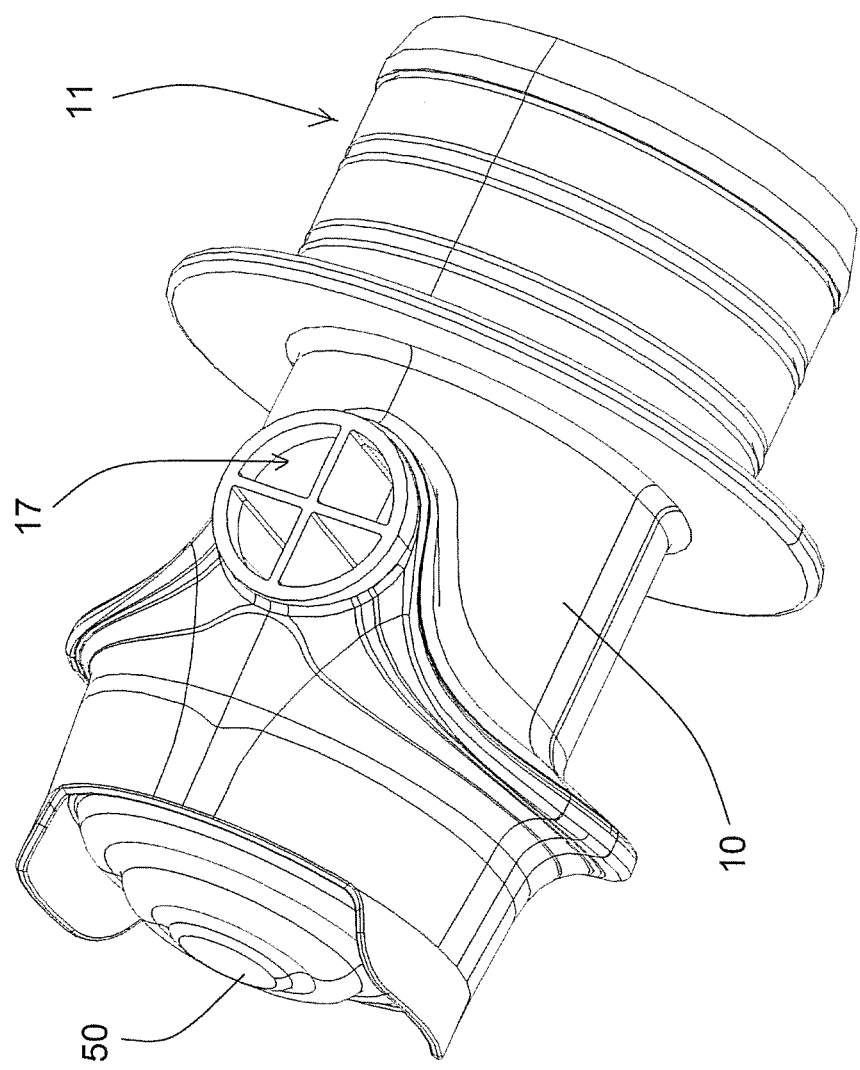
Figure 4:
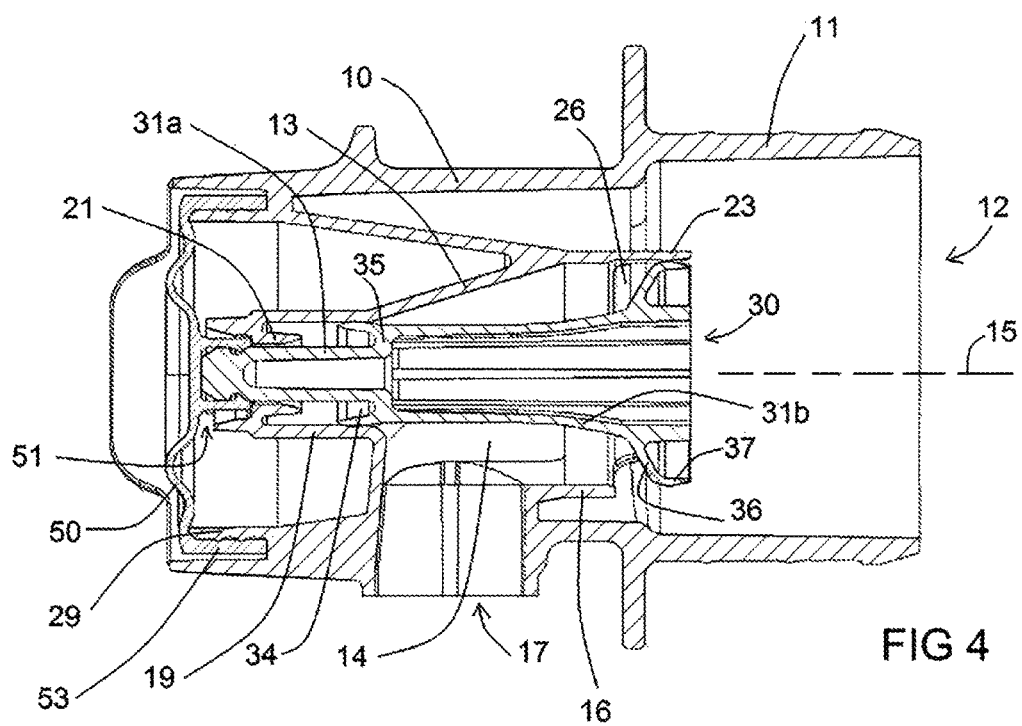
Figure 5:
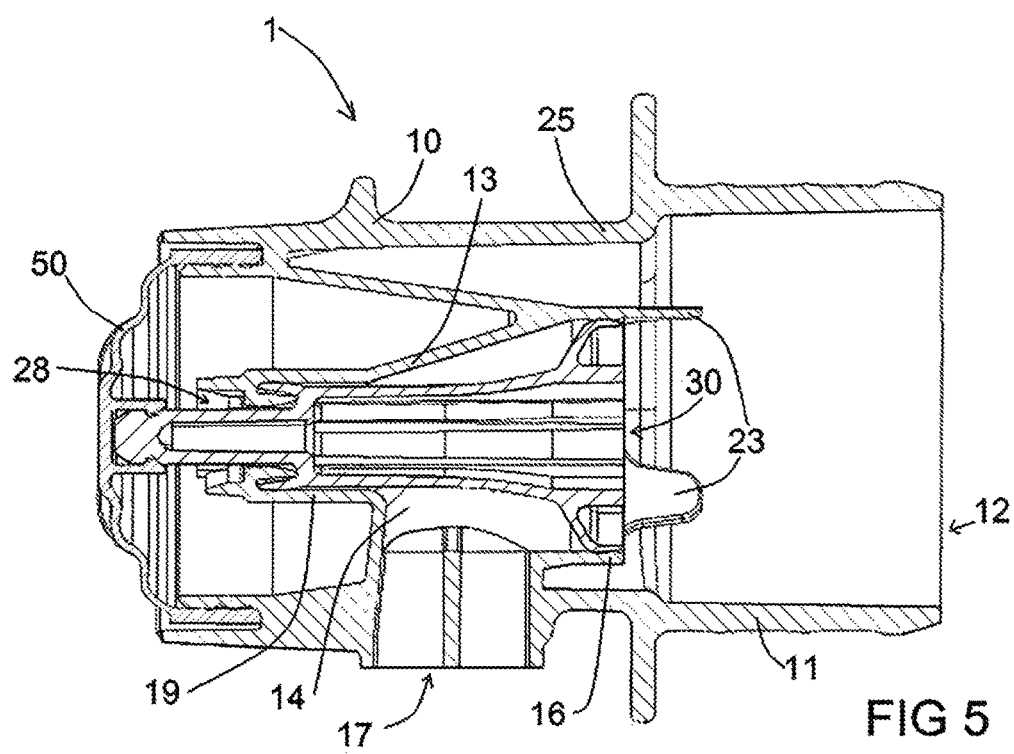
Figure 6:
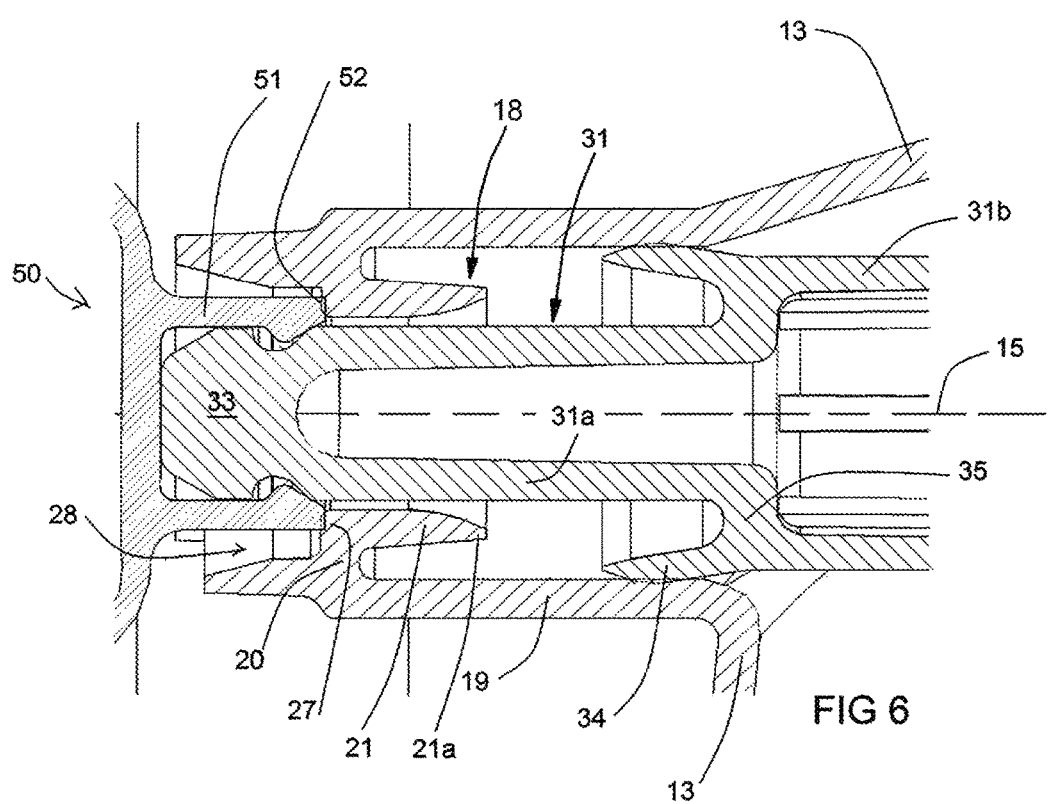
Figure 7:
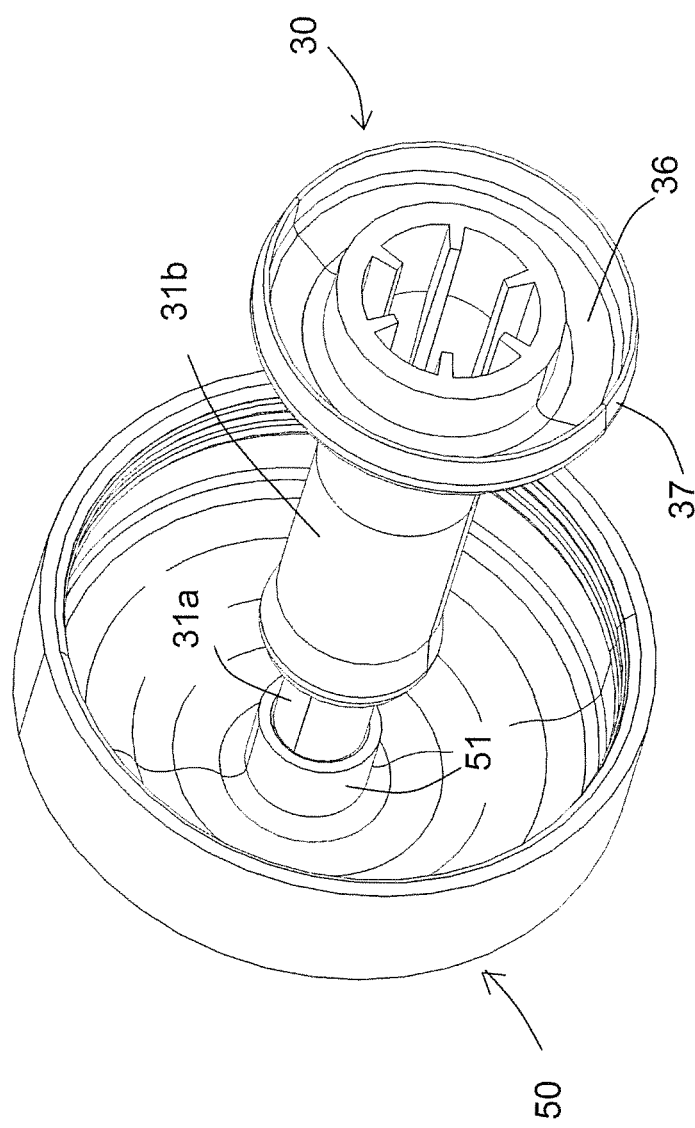
Figure 8:
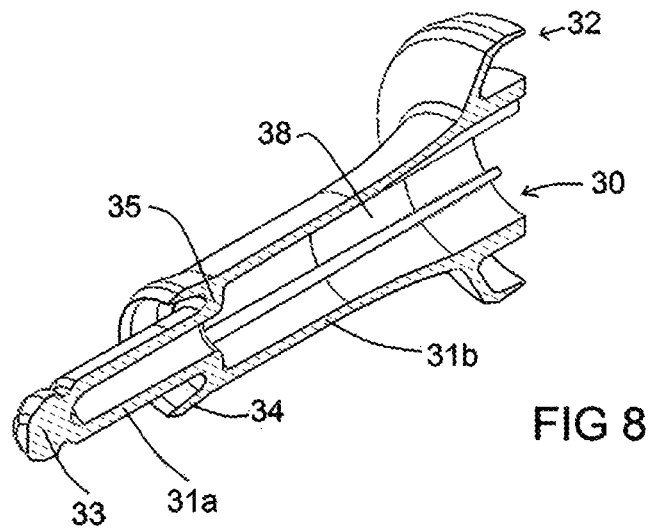
Figure 9:
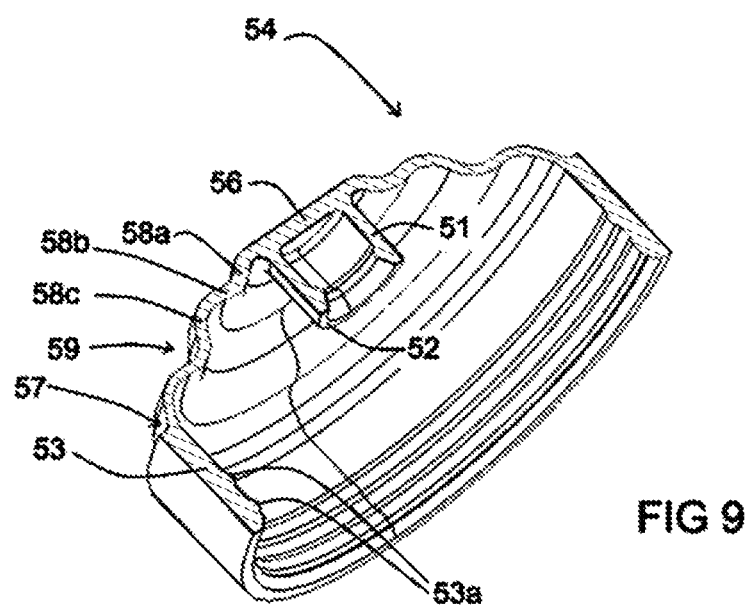
Figure 10:
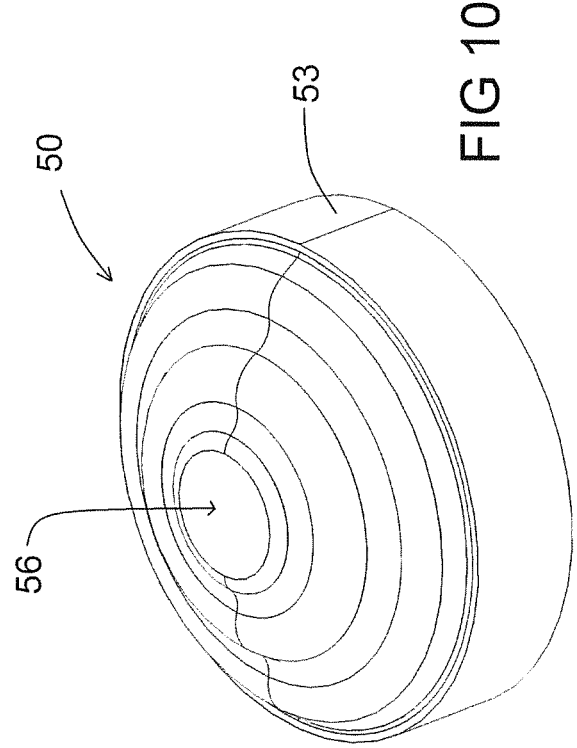
Figure 11:
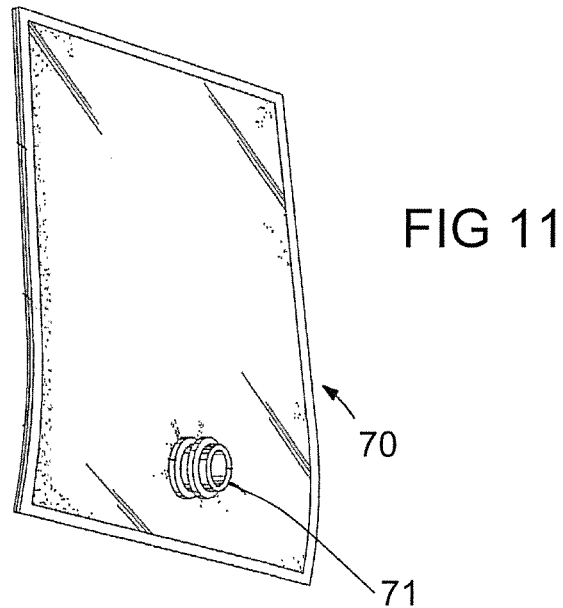
Figure 12:
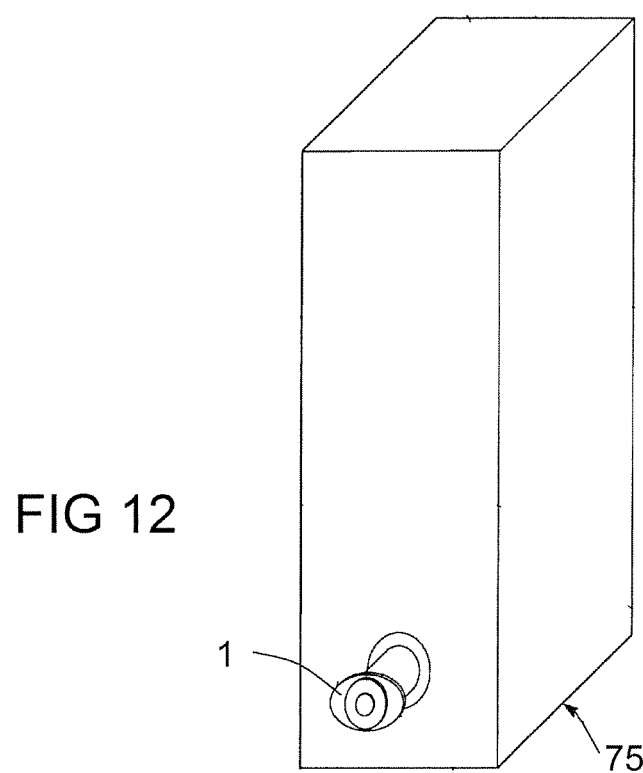

The invention will now be discussed with reference to the drawings. In the drawings:

FIG. 1 shows a perspective view of an example of a liquid dispensing tap according to the invention, FIG. 2 shows the tap of FIG. 1 in side view, FIG. 3 shows the tap of FIG. 1 from below in perspective view, FIG. 4 shows the tap of FIG. 1 in cross-section, with the tap being open, FIG. 5 shows the tap of FIG. 1 in cross-section, with the tap being closed, FIG. 6 shows a detail of FIG. 4 on a larger scale, FIG. 7 shows in perspective view the plunger and push button of the tap of FIG. 1, FIG. 8 shows in cross section the plunger of the tap of FIG. 1, FIG. 9 shows a cross section of a push button of the tap of FIG. 1, FIG. 10 shows the push button of FIG. 9 in a perspective view, FIG. 11 shows a pouch, e.g. a pouch of a bag in box container, to which the tap of FIG. 1 can be fitted, FIG. 12 shows a bag in box container provided with the tap of FIG. 1.

In the drawings a liquid dispensing tap 1 is shown that is adapted to be connected to a liquid container, e.g. to a pouch of a bag in box container, for controlled dispensing of a liquid from the container. For example the pouch of the bag in box container is filled with a beverage, e.g. wine. The pouch may be provided with a fitment to which the tap 1 is connected or the tap 1 can be directly connected to the pouch. Instead of a pouch the container may also have another design, e.g. as a bottle, canister, etc.

The tap 1 is, as is preferred, assembled from just three one piece plastic components:
 a housing 10,
 a plunger 30,
 a push button 50.

As is known in the art the tap 1 can be provided with a removable covering seal that extends over the outlet in order to avoid any ingress of foreign matter.

The housing 10 is preferably a rigid and one piece injection molded plastic part.

The housing 10 comprises a connector portion 11 that is adapted to connect the tap to a liquid container and forms an inlet 12 of the tap via which liquid from the container enters the tap 1.

The housing 10 further comprises, as integral part thereof as is preferred, a dispensing chamber wall portion 13 delimiting a dispensing chamber 14 having an axis 15. This dispensing chamber wall portion 13 comprises a valve seat 16 at an axial end thereof and forms a lateral dispensing outlet 17 of the tap 1 that is in open communication with the dispensing chamber 14.

In this example the outlet 17 has an internal crucifix wall structure that counteracts dripping and directs the outflowing liquid.

The plunger 30 is, as is preferred, a one piece molded plastic plunger. Preferably the plunger is made of a plastic material that is less rigid than the plastic material of the housing 10, e.g. of a semi rigid plastic material.

The plunger 30 has a stem 31 and a valve portion 32 that is integrally molded with the stem 31. The stem 31 has an actuator engagement portion 33 outside the dispensing chamber, generally at the front side of the tap 1 in practical use. The stem 31 extends along the axis 17 through a bore 18 in the dispensing chamber wall portion 13 and through the dispensing chamber 14.

The valve portion 32 is embodied to cooperate with the valve seat 16. The plunger 30 is axially movable or reciprocable along the axis 15 between a closed position, wherein the tap 1 is closed, and an open position, wherein the tap is open.

As a third and here final component the tap 1 comprises the push button 50 that acts as manually operable plunger actuator of the tap 1. The button 50 is coupled to the engagement portion 33 of the stem 31 of the plunger 30 and allows a user to open the tap 1 for dispensing of liquid from the container.

The bore 18 forms a cylinder 19 along the axis 15. The plunger 30 has an integrally molded annular flexible sealing lip 34 that extends around the stem 31. This lip 34 slides within and sealing engages the cylinder 19 in any position of the plunger 30.

As can best be seen in FIG. 6 the bore has an end wall 20 at one end of the cylinder 19. Furthermore the bore has a guide sleeve 21 adjoining this end wall 20. This sleeve is concentric with the cylinder 19 and has an inner diameter smaller than the inner diameter of the cylinder 19. The stem 31 extends through the guide sleeve 21 with some play. In the example shown the guide sleeve 21 extends fully within the cylinder 19.

The stem has a small diameter section 31a extending through the guide sleeve 21 and large diameter section 31b within the dispensing chamber 14. The stem 31 has a shoulder 35 between the small and large diameter sections 31a, 31b.

In the illustrated example the shoulder 35 forms a stop portion of the plunger 30. The guide sleeve 21 has a plunger stop end face 21a remote from the end wall 20. In cooperation with the shoulder 35 acting as corresponding stop portion of the plunger, the plunger stop end face determines the closed position of the plunger 30 wherein the tap 1 is closed.

The annular flexible sealing lip 34, that provides a seal and support where the plunger 30 extends through the wall portion 13, extends from the shoulder 35 and is concentric about the small diameter section 31a of the stem 31.

The valve seat 16 has a substantially cylindrical valve seat surface, e.g. with none or a minimal tapering, e.g. less than 6 degrees taper.

The valve portion 32 is embodied as a dish 36 with a flexible peripheral rim 37 that is primarily compressed in radial direction when contacting this cylindrical valve seat surface of the valve seat 16.

The stem 31 is a hollow cavity stem, or a tubular stem, with a hollow cavity 38 that extends from an open end at the valve portion 32 through the large and small diameter sections 31a,b to a blind end at the side of the engagement portion 33.

The dispensing chamber wall portion 13 is provided with multiple guide fingers 23 that extend away from the valve seat 16 in the direction of the open position of the plunger 30. These fingers 23, e.g. three fingers at circumferentially spaced locations, each have a free end remote from the valve seat 16. The guide fingers 23 guide and support the valve portion 32 as the plunger 30 is moved between the closed and open position thereof.

As can best be seen in FIG. 4,—in the open position—a liquid port 26 is exposed between adjacent fingers 23 allowing passage of liquid from the inlet into the dispensing chamber 14 and then to the outlet 17.

The fingers 23 each have a guide face with a curvature corresponding to a curvature of the guided valve portion 31 when considering the circumferential direction of the valve portion 31.

As illustrated the fingers 23 each have sides that determine an increasing width of the finger in the direction towards the valve seat 16. This causes an amplified increased reduction of the effective liquid port area when the plunger moves to the closed position. By suitable design of the dimensions of the fingers 23 the designer can obtain desired regimes of opening and closing of the tap as well as dispensing regimes. For example housings can be manufactured for different liquid products that only vary with regard to the fingers 23, which can be easily done by using different design injection molding cores. The various housings can then be combined with identical plungers 30 and push buttons 50 and still one obtains variation of the mentioned regimes.

As shown in the figures the housing 10 has an outer wall portion 25 forming an exterior of the tap 1. The dispensing chamber wall portion 13 here forms the valve seat 16 within and spaced from the surrounding outer wall portion 25, here shown as a gap between the valve seat 16 and the surrounding wall 25.

The manually depressable push button 50 is exposed to allow operation by a user's finger, e.g. a thumb. In the shown embodiment the push button 50 is embodied as a one piece resilient material push button, as is preferred of polypropylene (PP) material, providing a biasing force on the plunger 30 urging the plunger to the closed position thereof. In an alternative the push button is made of an elastomer, e.g. a thermoplastic elastomer (TPE).

The push button 50 comprises a snap fit collar 51 having an outer diameter. This snap fit collar 51 is snap fitted over a snap fit head 33 forming the engagement portion of the stem 31. The snap fit collar 51 has an end forming a stop face 52. The housing has—at the bore 18—an abutment portion 27 that cooperates with this stop face of the snap fit collar 51 to define the open position of the plunger 30.

The FIG. 6 shows that the housing has—at the bore—a recessed locking cavity 28 into which the snap fit collar 51 enters when the plunger 30 is brought in the open position thereof. The recessed cavity 28 is embodied as a locking cavity which has a diameter corresponding to the diameter of the snap fit collar 51 such that the collar 51 is unable to disengage from the snap fit head 33 of the stem 31 when entered into the locking cavity.

The push button 50, embodied as a one piece resilient material push button, provides the biasing force that urges the plunger 30 to the closed position. So when the user release the button 50, the button 50 exerts said biasing force, e.g. the button being made of polypropylene (PP).

The push button 50 has a collar portion 53, here circular as is preferred, that is secured to the housing of the tap 1 and a depressable wall 54 bridging the collar portion 53.

The collar portion 53 is held on a tubular retention wall portion 29 of the housing, here a cylindrical wall portion 29 protruding axially from the chamber wall portion 13, opposite the chamber 14.

The collar portion 53 here clamps elastically on the inner retention wall portion 29. To enhance the retention the collar portion has circular ridges 53a on the inner face thereof and the wall portion has mating circular grooves. In another embodiment the collar portion 53 is fitted within a tubular retention wall, e.g. with mating formations on the outside of the collar portion and the inside of the retention wall.

The depressable wall portion 54 has a user engagement face, or front face, with a central area 56. The collar 51 is integral with said area at the opposite or rear side of the button 50. As shown in FIGS. 7 and 8, in the non-mounted condition of the push button, the central area 56 is axially raised relative to the outer perimeter 57 of the wall portion, which perimeter 57 adjoins the collar 53.

Between the central area 56 and the outer perimeter 57 the depressable wall portion 54 has multiple concentric undulations 58, 59 that enhance the resiliency and form restoring effect of the wall portion 54.

As shown here each undulation 58, 59 is formed by three concentric and integral regions:
  a first conical annular region 58a, widening towards the outer perimeter of the wall portion,
  an intermediate radial annular region 58b, adjoining the first conical annular region and extending substantially in a radial plane of the push button,
  a second conical annular region 58c, adjoining the intermediate radial annular region and widening towards the outer perimeter of the wall portion.

In the embodiment shown here the push button 50 has two undulations 58, 59, whereas in another embodiment the button may have a single undulation.

FIG. 11 shows a pouch 70, for example a pouch 70 of a bag in box container. The pouch has a fitment 71 to which the tap 1 of FIG. 1 can be fitted.

FIG. 12 shows a bag in box container 75, e.g. with a carton outer container and inside thereof the pouch 70, provided with the tap 1 of FIG. 1.

The invention claimed is:

1. A liquid dispensing tap adapted to be connected to a liquid container, for controlled dispensing of a liquid from said container, the tap comprising:
  a housing comprising:
    a connector portion adapted to connect the tap to the liquid container and forming an inlet of the tap,
    a dispensing chamber wall portion delimiting a dispensing chamber having an axis, which dispensing chamber wall portion comprises a valve seat at an axial end thereof and forms a dispensing outlet of the tap in open communication with said dispensing chamber,
  a one piece molded plastic plunger having a valve portion that is integrally molded with a stem of the plunger, wherein the stem has an actuator engagement portion (33) outside said dispensing chamber and wherein the stem extends along said axis through a bore in said dispensing chamber wall portion and through the dispensing chamber, wherein the valve portion is embodied to cooperate with the valve seat, and wherein the plunger is axially movable between a closed position, wherein the tap is closed, and an open position, wherein the tap is open, a manually operable plunger actuator which engages said engagement portion of the stem of the plunger allowing a user to open the tap for dispensing of liquid, characterized in that the plunger has an integrally molded annular flexible sealing lip that extends around the stem, and in that the bore forms a cylinder along said axis, and wherein the sealing lip slides within and sealingly engages the cylinder in any operative position of the plunger within the cylinder, and wherein the bore has an end wall at one end of said cylinder, and wherein the bore has a guide sleeve adjoining said end wall, which guide sleeve is concentric with said cylinder and has an inner diameter smaller than an inner diameter of said cylinder, wherein the stem extends through said guide sleeve.

2. A tap according to claim 1, wherein the guide sleeve extends at least partially within said cylinder, and wherein said guide sleeve has a plunger stop end face, wherein the plunger has a corresponding stop portion, so that the plunger stop end face determines the closed position of the plunger.

3. A tap according to claim 2, wherein the stem has a small diameter section extending through said guide sleeve and large diameter section within the dispensing chamber, wherein the stem has a shoulder between said small and large diameter sections, and wherein said shoulder forms the stop portion of the plunger.

4. A tap according to claim 2, wherein the stem has a small diameter section extending through said guide sleeve and a large diameter section within the dispensing chamber, wherein the stem has a shoulder between said small and large diameter sections, and wherein the annular flexible sealing lip extends from said shoulder, concentrically about the small diameter section of the stem.

5. A tap according to claim 2, wherein the valve seat has a substantially cylindrical valve seat surface, and wherein the valve portion is embodied as a dish with a flexible peripheral rim that is primarily compressed in radial direction when contacting said valve seat surface.

6. A tap according to claim 1, wherein the stem is hollow with an open end at the side of the valve portion and a blind end at the side of the engagement portion.

7. A liquid dispensing tap adapted to be connected to a liquid container for controlled dispensing of a liquid from said container, the tap comprising:
a housing comprising:
a connector portion adapted to connect the tap to the liquid container and forming an inlet of the tap,
a dispensing chamber wall portion delimiting a dispensing chamber having an axis, which dispensing chamber wall portion comprises a valve seat at an axial end thereof and forms a dispensing outlet of the tap in open communication with said dispensing chamber,
a one piece molded plastic plunger having a valve portion that is integrally molded with a stem of the plunger, wherein the stem has an actuator engagement portion outside said dispensing chamber and wherein the stem extends along said axis through a bore in said dispensing chamber wall portion and through the dispensing chamber, wherein the valve portion is embodied to cooperate with the valve seat, and wherein the plunger is axially movable between a closed position, wherein the tap is closed, and an open position, wherein the tap is open, a manually operable plunger actuator which engages said engagement portion of the stem of the plunger allowing a user to open the tap for dispensing of liquid, characterized in that the plunger has an integrally molded annular flexible sealing lip that extends around the stem, and in that the bore forms a cylinder along said axis, and wherein the sealing lip slides within and sealingly engages the cylinder in any operative position of the plunger within the cylinder, and wherein the dispensing chamber wall portion is provided with multiple guide fingers that extend axially away from the valve seat in the direction of the open position of the plunger, which guide fingers each have a free end remote from the valve seat, wherein the guide fingers guide and support the valve portion as the plunger is moved between the closed and open position thereof, wherein—in the open position—liquid ports are exposed between the fingers allowing passage of liquid from the inlet into the dispensing chamber.

8. A tap according to claim 7, wherein the guide fingers each have a guide face with a curvature corresponding to a curvature of the guided valve portion.

9. A tap according to claim 1, wherein the housing has an outer wall portion forming an exterior of the tap, and wherein the dispensing chamber wall portion forms the valve seat within and radially spaced from said outer wall portion.

10. A tap according to claim 1, wherein the actuator is a manually depressable push button, that is exposed to allow operation by a user's finger.

11. A tap according to claim 10, wherein the push button comprises a collar having an outer diameter, which collar is snap fitted over a head forming the engagement portion of the stem of the plunger, wherein the collar has an end forming a stop face, and wherein the housing has —at said bore —an abutment portion that cooperates with said stop face of the collar to define the open position of the plunger, and wherein the housing has —at said bore —a recessed cavity into which the collar enters when the plunger moves in the open position thereof, and wherein the recessed cavity is embodied as a locking cavity which has a diameter corresponding to the diameter of the collar such that the collar is unable to disengage from the head when entered into the locking cavity.

12. A tap according to claim 1, wherein the actuator comprises a resilient biasing member providing a biasing force on the plunger urging the plunger to the closed position thereof.

* * * * *